(12) United States Patent
Modarres Razavi et al.

(10) Patent No.: US 10,644,775 B2
(45) Date of Patent: May 5, 2020

(54) UNCERTAINTY DEPENDENT BEAMFORMING CONFIGURATION CONTROL

(71) Applicant: Telefonaktiebolaget LM Ericsson (publ), Stockholm (SE)

(72) Inventors: Sara Modarres Razavi, Linköping (SE); Mirsad Cirkic, Linköping (SE); Martin Hessler, Linköping (SE); Reza Moosavi, Linköping (SE); Henrik Rydén, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 15/554,909

(22) PCT Filed: Mar. 10, 2015

(86) PCT No.: PCT/EP2015/054965
§ 371 (c)(1),
(2) Date: Aug. 31, 2017

(87) PCT Pub. No.: WO2016/141975
PCT Pub. Date: Sep. 15, 2016

(65) Prior Publication Data
US 2018/0041261 A1 Feb. 8, 2018

(51) Int. Cl.
*H04B 7/06* (2006.01)
*H04B 7/0408* (2017.01)
*H04W 52/42* (2009.01)

(52) U.S. Cl.
CPC ......... *H04B 7/0617* (2013.01); *H04B 7/0408* (2013.01); *H04B 7/0632* (2013.01);
(Continued)

(58) Field of Classification Search
None
See application file for complete search history.

(56) References Cited

U.S. PATENT DOCUMENTS 6,229,481 B1 * 5/2001 Katz .................. H04W 16/28
342/367
7,151,951 B2 12/2006 Goransson et al.
(Continued)

FOREIGN PATENT DOCUMENTS

JP 2006512001 A 4/2006
JP 2007028569 A 2/2007
(Continued)

OTHER PUBLICATIONS

3rd Generation Partnership Project, "Technical Specification Group Radio Access Network; Evolved Universal Terrestrial Radio Access (E-UTRA); Physical channels and modulation (Release 12)", 3GPP TS 36.211 V12.4.0, Dec. 2014, pp. 1-124.

*Primary Examiner* — Lonnie V Sweet
(74) *Attorney, Agent, or Firm* — Patent Portfolio Builders, PLLC

(57) ABSTRACT

A signal quality associated with radio transmissions from a first device (100) to a second device (10) is determined. Further, an uncertainty of the determined signal quality is determined. Depending on the determined signal quality and uncertainty, a beamforming configuration, applied by the first device (100) for performing the radio transmissions to the second device (10), is adapted.

21 Claims, 10 Drawing Sheets

(52) U.S. Cl.
CPC ......... *H04B 7/0656* (2013.01); *H04B 7/0639* (2013.01); *H04B 7/0695* (2013.01); *H04W 52/42* (2013.01)

(56) References Cited

U.S. PATENT DOCUMENTS

| | | |
|---|---|---|
| 7,233,811 B2 | 6/2007 | Iwami et al. |
| 7,406,336 B2 | 7/2008 | Astely et al. |
| 8,116,819 B2 | 2/2012 | Niu et al. |
| 8,416,872 B2 | 4/2013 | Higuchi et al. |
| 8,658,289 B2 | 2/2014 | Polcyn et al. |
| 9,319,124 B2 | 4/2016 | Seol et al. |
| 10,396,874 B1 * | 8/2019 | Garrett .................. H04W 36/32 |
| 2009/0088174 A1 | 4/2009 | Kikuchi et al. |
| 2010/0182967 A1 * | 7/2010 | Zorba Barah ........ H04B 7/0452 370/329 |
| 2013/0045690 A1 | 2/2013 | Seol et al. |
| 2013/0229307 A1 | 9/2013 | Chang et al. |
| 2013/0336135 A1 | 12/2013 | Lindoff et al. |

FOREIGN PATENT DOCUMENTS

| | | |
|---|---|---|
| JP | 2007521708 A | 8/2007 |
| JP | 2009088649 A | 4/2009 |
| JP | 2010130192 A | 6/2010 |
| JP | 2011505686 A | 2/2011 |
| JP | 2013106270 A | 5/2013 |
| JP | 2014524705 A | 9/2014 |
| WO | 02052751 A1 | 7/2002 |

* cited by examiner

UNCERTAINTY DEPENDENT BEAMFORMING CONFIGURATION CONTROL

TECHNICAL FIELD

The present invention relates to methods for controlling radio transmissions and to corresponding devices.

BACKGROUND

In radio communication networks it is known to utilize multi-antenna techniques to increase performance. For example, in the case of the LTE (Long Term Evolution) cellular radio technology specified by 3GPP ($3^{rd}$ Generation Partnership Project), multi-antenna transmission techniques may be applied by operating multiple antennas of a base station, in the LTE radio technology referred to as "evolved Node B" (eNB), in a transmit diversity mode or in a spatial multiplexing mode (see, e.g., 3GPP TS 36.211 V12.4.0).

When using such multi-antenna techniques, the transmitted signal from each antenna may be controlled in such a way that the received signal from each antenna adds up coherently at a certain receiver, e.g., a user equipment (UE). In this way, the overall transmit signal from all antennas results in a received signal power which is relatively increased in one or more spatial directions, i.e., forms one or more beams. Such control is referred to as beamforming.

For efficient utilization of beamforming, accurate knowledge of signal quality associated with each beam is an important aspect. At the eNB such knowledge may for example be obtained by letting the UE transmit a predetermined reference signal, measuring this reference signal as received at the multiple antennas, and estimating the signal quality associated with a given beamforming configuration on the basis of the measured reference signals, assuming reciprocity of uplink and downlink transmission direction. Further, a predefined codebook may be applied, which defines which beamforming configuration to apply depending on feedback from the UE. Such feedback may for example include reports of channel quality as measured by the UE while performing transmissions on a certain beam.

However, in certain scenarios, the known ways of controlling the beamforming configuration as applied with respect to a certain UE may provide unsatisfactory results, due to estimates of the signal qualities which the selection of the currently applied beamforming configuration is based on being outdated or not sufficiently accurate. This may for example result in selecting a beamforming configuration in which the beam "misses" the UE, which means that the performance experienced by this UE may be even less than without utilization of beamforming. This problem becomes worse as the beams become more focused by utilization of a larger number of antennas. On the other hand, there are also limitations with respect to improving the accuracy of the estimates of the signal qualities. For example, once a certain beam is defined for transmissions to the UE, the UE will only perform measurements on this beam, and accurate assessment of the signal qualities which could be achieved by other beams may not be possible. Further, also the temporal density and power at which the UE may transmit reference signals to the eNB is typically limited, and estimating signal quality which can be achieved in the downlink direction on the basis of measurements on signals transmitted in the uplink direction may introduce various kinds of systematic errors.

Accordingly, there is a need for techniques which allow for efficiently utilizing beamforming for radio transmissions.

SUMMARY

According to an embodiment of the invention, a method of controlling radio transmissions is provided. According to the method, a signal quality associated with radio transmissions from a first device to a second device is determined. Further, an uncertainty of the determined signal quality is determined. Depending on the determined signal quality and uncertainty, a beamforming configuration, applied by the first device for performing the radio transmissions to the second device, is adapted.

According to a further embodiment of the invention, a device is provided. The device is configured to determine a signal quality associated with radio transmissions from a first device to a second device. Further, the device is configured to determine an uncertainty of the determined signal quality. Further, the device is configured to adapt, depending on the determined signal quality and uncertainty, a beamforming configuration applied by the first device for performing the radio transmissions to the second device.

According to a further embodiment of the invention, a computer program or computer program product is provided, e.g., in the form of a non-transitory storage medium, which comprises program code to be executed by at least one processor of a device configured to control radio transmissions from a first device to a second device. Execution of the program code causes the device to determine a signal quality associated with radio transmissions from a first device to a second device. Further, execution of the program code causes the device to determine an uncertainty of the determined signal quality. Further, execution of the program code causes the device to adapt, depending on the determined signal quality and uncertainty, a beamforming configuration applied by the first device for performing the radio transmissions to the second device.

Details of such embodiments and further embodiments will be apparent from the following detailed description of embodiments.

DETAILED DESCRIPTION OF EMBODIMENTS

Figure 1:
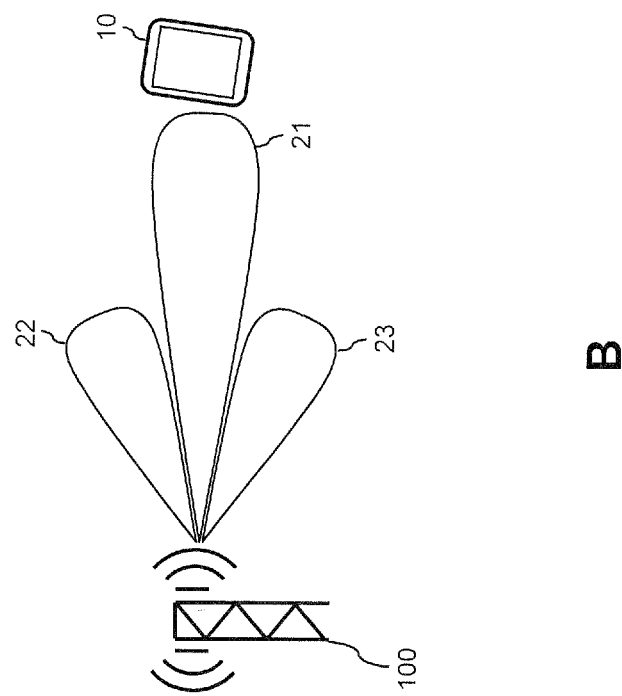
FIGS. 1A and 1B schematically illustrate adaptation of a beamforming configuration according to an embodiment of the invention.
Figure 1:
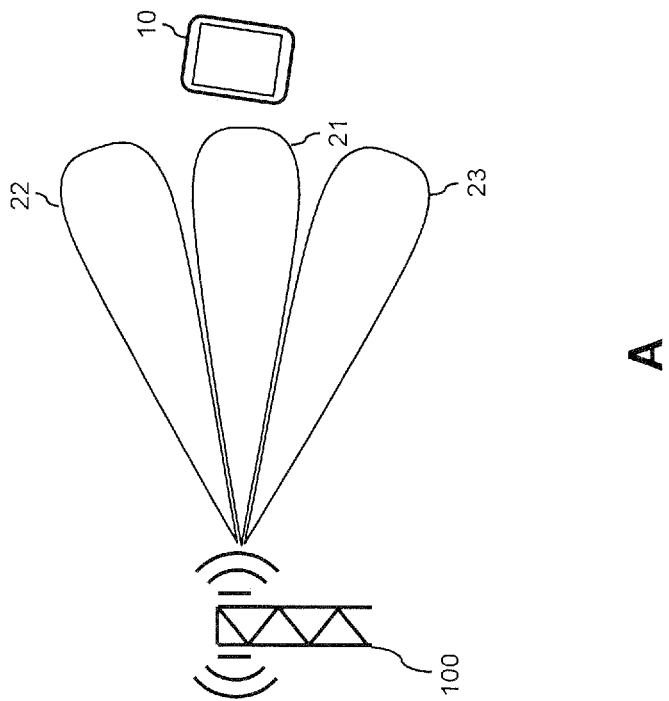

In the following, concepts in accordance with exemplary embodiments of the invention will be explained in more detail and with reference to the accompanying drawings. The illustrated embodiments relate to control of radio transmissions between a cellular network and communication devices, in the following also referred to as UEs. Specifically, the illustrated examples assume that beamforming is applied for downlink radio transmissions from a base station of the cellular network to a certain UE. However, it is to be understood that the concepts could also be applied for uplink radio transmissions from the UE to the cellular network. The cellular network may for example be based on the LTE radio technology. However, it is to be understood that the illustrated concepts could also be applied in connection with other radio technologies, e.g., other cellular radio technologies, e.g., a 5G ($5^{th}$ Generation cellular radio technology), WLAN (Wireless Local Area Network) technologies, or PAN (Personal Area Network) technologies.

The beamforming may be based on utilizing an array of multiple antennas at the base station and at the UE. A codebook-based beamforming mechanism may be applied, in which a preconfigured codebook is utilized which maps precoding vectors to signal qualities as reported by the UE. The base station may utilize a signal quality reported by the UE to select the corresponding precoding vector which defines a certain beam. In the illustrated concepts, it is taken into account that various error factors, such as measurement of the signal quality or variations of radio channel conditions, results in a probability of the beam as selected based on the codebook not offering a desired performance, e.g., because the UE is actually outside the spatial region on which this beam focuses. Such probability of an inappropriate selection may also be due to the signal value reported by the UE being outdated.

In the illustrated concepts, a beamforming configuration as applied for radio transmissions from the base station to the UE is not only adapted depending on a signal quality associated with the radio transmissions, e.g., based on channel quality reports from the UE, but also on an uncertainty of the determined signal quality. The uncertainty represents an error probability of the signal quality. That is to say, a high value of the uncertainty may indicate a high statistical probability that the estimated signal quality value is inaccurate, and a low value of the uncertainty may indicate a low statistical probability that the estimated signal quality value is inaccurate. The uncertainty may for example be determined on the basis of a measurement uncertainty as determined by error analysis and/or statistical methods and/or on the basis of an age of measurements or reports used for determining the signal quality. The beamforming configuration may be adapted by defining a set of beams which may include more than one beam. That is to say, in certain scenarios with high uncertainty of the determined signal quality, the beamforming configuration may be adapted to provide multiple beams, so that a larger spatial region may be covered by the radio transmissions and the likelihood of the UE successfully receiving the radio transmissions may be increased. These multiple beams may include the beam selected according to the mapping defined by the codebook and one or more spatially neighboring beams, e.g., as defined by another precoding vector from the codebook. The number of beams may be increased as the uncertainty increases. The signal quality and the uncertainty may be determined for each of such multiple beams. Accordingly, the beamforming configuration may be dynamically controlled in such a way that more weight is put to beams offering higher performance.

Accordingly, in an exemplary process an initial beamforming configuration defining a set of one or more beams may be selected for the UE and applied by the base station when performing radio transmissions to the UE. During these radio transmissions, the UE may measure the signal quality for each of the beams and report the measured signal quality to the base station. The base station may then determine the uncertainty of each reported signal quality and then adapt the beamforming configuration depending on both the reported signal quality of each beam and the associated uncertainty. The adaptation may for example involve adapting a weighting of the beams in terms of transmit power and/or code rate. The code rate may be set by selection of a Modulation and Coding Scheme (MCS). This may for example involve increasing the transmit power and/or code rate for a beam offering a higher signal quality and/or decreasing the transmit power and/or code rate for a beam offering a lower signal quality. Further, this may involve decreasing the transmit power and/or code rate for a beam offering a higher uncertainty of the determined signal quality while increasing the transmit power and/or code rate for other beams, e.g., spatially neighboring beams. Similarly, this may involve increasing the transmit power and/or code rate for a beam offering a lower uncertainty of the determined signal quality while decreasing the transmit power and/or code rate for other beams, e.g., spatially neighboring beams. Still further, also the number of the beams may be adapted depending on the uncertainty. For example, if a higher uncertainty is determined for one or more of the beams, the number of the beams may be increased to thereby allow for covering a larger spatial region by the beams. Similarly, if a lower uncertainty is determined for one or more of the beams, the number of the beams may be decreased. Here, a higher uncertainty may refer to the uncertainty being higher than a previously determined uncertainty or to the uncertainty being higher than a threshold.

Similarly, a lower uncertainty may refer to the uncertainty being lower than a previously determined uncertainty or to the uncertainty being lower than a threshold. The adapted beamforming configuration may then be applied by the base station when performing radio transmissions to the UE, and the process may be repeated in an iterative manner to allow for dynamically taking into account changing conditions, e.g., due to movement of the UE, shadowing, channel fading, or the like.

FIGS. 1A and 1B schematically illustrate examples of adapting the beamforming configuration in accordance with the concepts as outlined above. In particular, FIG. 1A illustrates a first beamforming configuration applied for radio transmissions from the base station 100 to the UE 10, and FIG. 1B illustrates a second beamforming configuration as applied for radio transmissions from the base station to the UE 10. Each of the first and second beamforming configuration includes a primary beam 21, as selected according to the codebook depending on the signal quality reported by the UE 10, and spatially neighboring beams 22, 23 of the primary beam 21.

The scenario of FIG. 1A may correspond to a situation in which the base station sends N bits of data to the UE 10. The base station 100 may spread radio transmissions of these bits according to a certain weighting over three different beams 21, 22, 23. As mentioned above, this weighting may be achieved by distributing a total transmit power over the beams 21, 22, 23 and/or by using a certain code rate for each of the beams 21, 22, 23. Such code rates may be set by applying a corresponding modulation and coding scheme. The weighting of the different beams 21, 22, 23 depends on the uncertainty of the estimated signal quality for the radio transmissions on the beams 21, 22, 23. In the case of a high uncertainty, the first beamforming configuration as illustrated in FIG. 1A may be selected. In the first beamforming configuration, the different beams 21, 22, 23 are weighted equally. That is to say, the same weight is assigned to the primary beam 21 and to each of the neighboring beams 22, 23. In the case of a low uncertainty, the second beamforming configuration as illustrated in FIG. 1B may be selected. In the second beamforming configuration, the primary beam 21 is prioritized by assigning a higher weight to the primary beam 21 than to the neighboring beams 22, 23.

Figure 2:
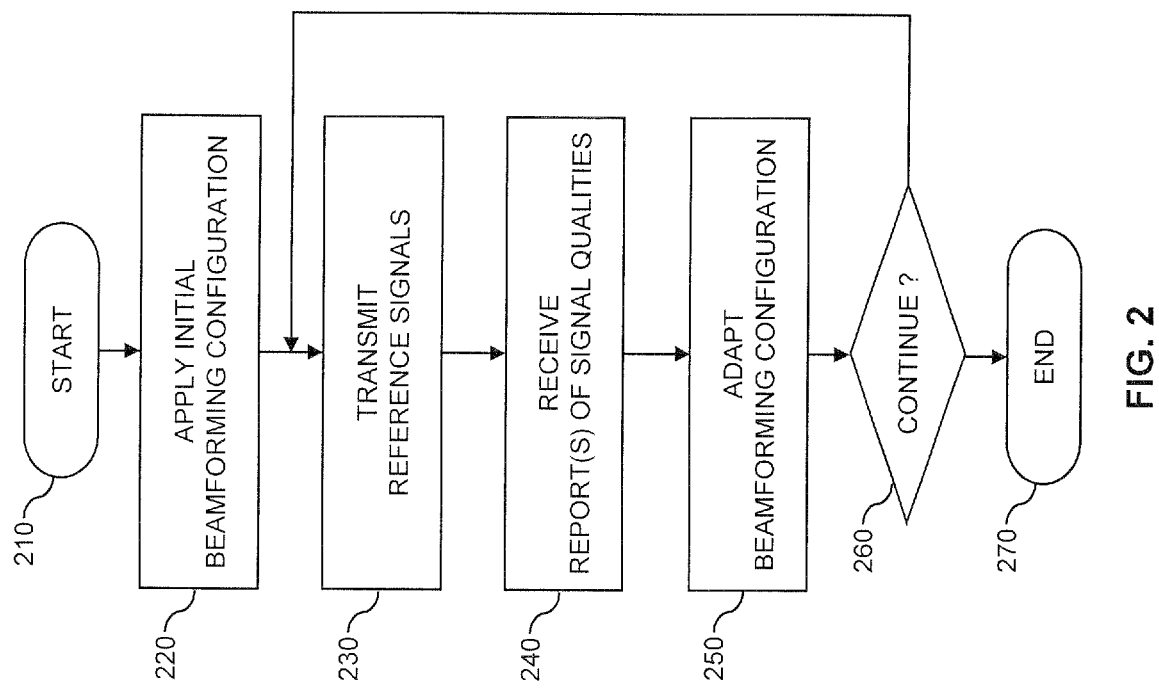
FIG. 2 shows a process of adapting a beamforming configuration according to an embodiment of the invention.

FIG. 2 shows a flowchart for illustrating a process to implement the adaptation of the beamforming configuration applied for the radio transmissions from the base station 100 to the UE 10. The process starts at step 210, e.g., when the base station 100 needs to transmit data to the UE 10 and thus establishes a radio connection to the UE 10.

At step 220, an initial beamforming configuration is applied for radio transmissions of the data. The initial beamforming configuration may be set without detailed knowledge of radio channel conditions between the base station 100 and the UE 10 and may thus be defined in a conservative manner, e.g., by assuming a large uncertainty. For example, the initial beamforming configuration may assume an equal weighting of multiple beams, such as illustrated in FIG. 1A.

At step 230, the base station may transmit reference signals to the UE 10. The reference signals may be transmitted in each of the beams in such a way that they are distinguishable by the UE 10. For example, a corresponding demodulation reference signal (DMRS) sequence may be transmitted in each of the different beams, and the DMRS sequences of the different beams may be orthogonal to each other to be distinguishable by the UE 10. By performing measurements on the reference signals, the UE 10 may determine a signal quality for each of the beams and report the measured signal qualities to the base station 100. The signal quality may for example be determined in terms of an SNR (Signal-to-Noise-Ratio) or an SINR (Signal-to-Interference-plus-Noise-Ratio).

In some scenarios, the UE 10 may only report the signal quality for those beams for which the signal quality was determined to be above a threshold. Such threshold can be an absolute number or can be defined as a relative value in relation to the highest signal quality of the beams. By reporting only those signal qualities which are above a threshold, signaling overhead associated with the report may be reduced.

In some scenarios, the UE 10 may report the signal quality as an absolute value. Alternative or in addition, the UE 10 may also report the signal quality as a relative value, e.g., defined in relation to an amount of data which the selected MCS allows to be transmitted over the beam. For example, the signal quality could be represented as a data throughput which can be achieved when selecting the MCS offering the highest performance.

At step 240, the base station 100 receives one or more reports of the measured signal qualities from the UE 10. In the above scenario where reports of the signal quality are sent only for beams having a signal quality above the threshold, if the base station 100 does not receive a report for a certain beam, it may implicitly determine that the signal quality of this beam is below the threshold.

At step 250, the base station 100 adapts the beamforming configuration depending on the measured signal qualities. For this purpose, the base station 100 may determine an uncertainty of the measured signal qualities, e.g., an individual uncertainty of the measured signal quality for each beam or an overall uncertainty which applies to the measured signal qualities of all beams. The base station 100 may determine the uncertainty on the basis of the reports received at step 240, e.g., by statistical analysis of the reported signal quality values. Further, the reports could also indicate the uncertainty of each measured signal quality, e.g., in terms of a measurement error estimate calculated by the UE 10. Further, the uncertainty may also be determined depending on the age of the measurements performed by the UE 10 or depending on the age of the reports received by the base station 100. For example, the reports could include timestamps indicating the time of sending the report or the times at which the reported signal qualities were measured. From this information, the base station 100 may in turn determine the current age of each measurement or report. With increasing age of the measurement or of the report in which the measurement was reported, the base station 100 may assign a higher uncertainty to the reported measured signal quality.

The result of the adaptation of step 250 is a new beamforming configuration. For example, this new beamforming configuration may assign different weights to the beams than the initial beamforming configuration. Further, the new beamforming configuration may also define a different number of beams than the initial beamforming configuration. For example, if the uncertainty of the measured signal qualities is high, the base station 100 may increase the number of beams. On the other hand, if the uncertainty of the measured signal qualities is low, the base station 100 may decrease the number of beams and/or prioritize a certain beam by assigning a higher weight to this beam.

The weight of a certain beam may be increased if the report from the UE 10 indicates a high relative signal quality of the beam. Similarly, the weight of the beam may be decreased if the report from the UE 10 indicates a low relative signal quality of the beam. Such relative signal qualities may be determined in relation to the signal qualities as measured for the other beams. For example, the relative signal quality of the beam could be defined as the ratio of the signal quality measured for this beam and the average of the signal qualities measured for the other beams.

In some cases, a certain beam may also be removed from the beam configuration or the weight of the beam may be set to zero. This may for example be done if the report indicates that the signal quality of the beam is below a threshold, e.g., the above-mentioned threshold for triggering reporting of the signal quality or some other threshold.

By considering the relative signal qualities associated with the beams, the adaptation of the beamforming configuration can be made more sensitive to the actual differences in performance between the different beams. In this way, the influence of effects which are similar for each beam may be reduced. For example, if there is a systematic error in the measurement of the signal qualities for all beams, a change in the weighting of the beams in the beamforming configuration can be avoided. From examples as further illustrated below, it can also be seen that in some scenarios the weight of a beam may be modified even if the signal quality measured for this beam does not change. For example, such modification may be triggered by changes in the signal qualities measured for the other beams and/or changes of the uncertainty associated with the measured signal quality values.

At step 260, the base station 100 may decide whether to continue with the radio transmissions or not. For example, the base station 100 may decide to continue with the radio transmissions if not all the data has been transmitted to the UE 10. The process may then return to step 230, and steps 230, 240, and 250 may be repeated in an iterative manner until the base station 100 decides to not continue with the radio transmissions, e.g., because all the data was transmitted to the UE 10, the UE 10 was handed over to another base station, or radio connectivity from the base station 100 to the base station was lost.

The uncertainty of the measured signal quality may for example be determined on the basis of an autocorrelation. Such autocorrelation may be performed by the UE 10 on a sequence of measurements, and the result of the autocorrelation may be reported to the base station 100 together with the measured signal quality value. Alternatively, the autocorrelation could be performed by the base station 100 on the measured signal qualities reported by the UE 10.

The autocorrelation at a given time instance k may for example involve calculating an autocorrelation function (ACF) on the basis of an ensemble average according to:

$$r(k) = \frac{1}{M|S|} \sum_{s \in S} \sum_{m=1}^{M} h_m^s \bar{h}_m^{s-k}, \quad (1)$$

where S denotes a set of considered measurements, |S| is the number of the considered measurements, M denotes the number of antennas, $h_m^s$ is a channel estimate for the m-th antenna at time instance s, and $\bar{h}_m^s$ is the complex conjugate of the channel estimate $h_m^s$. Moreover, the ACF can be normalized according to $$\bar{r}(k) = \frac{r(k)}{r(0)}. \quad (2)$$

By the normalization, effects of for example large-scale fading may be eliminated.

Figure 3:
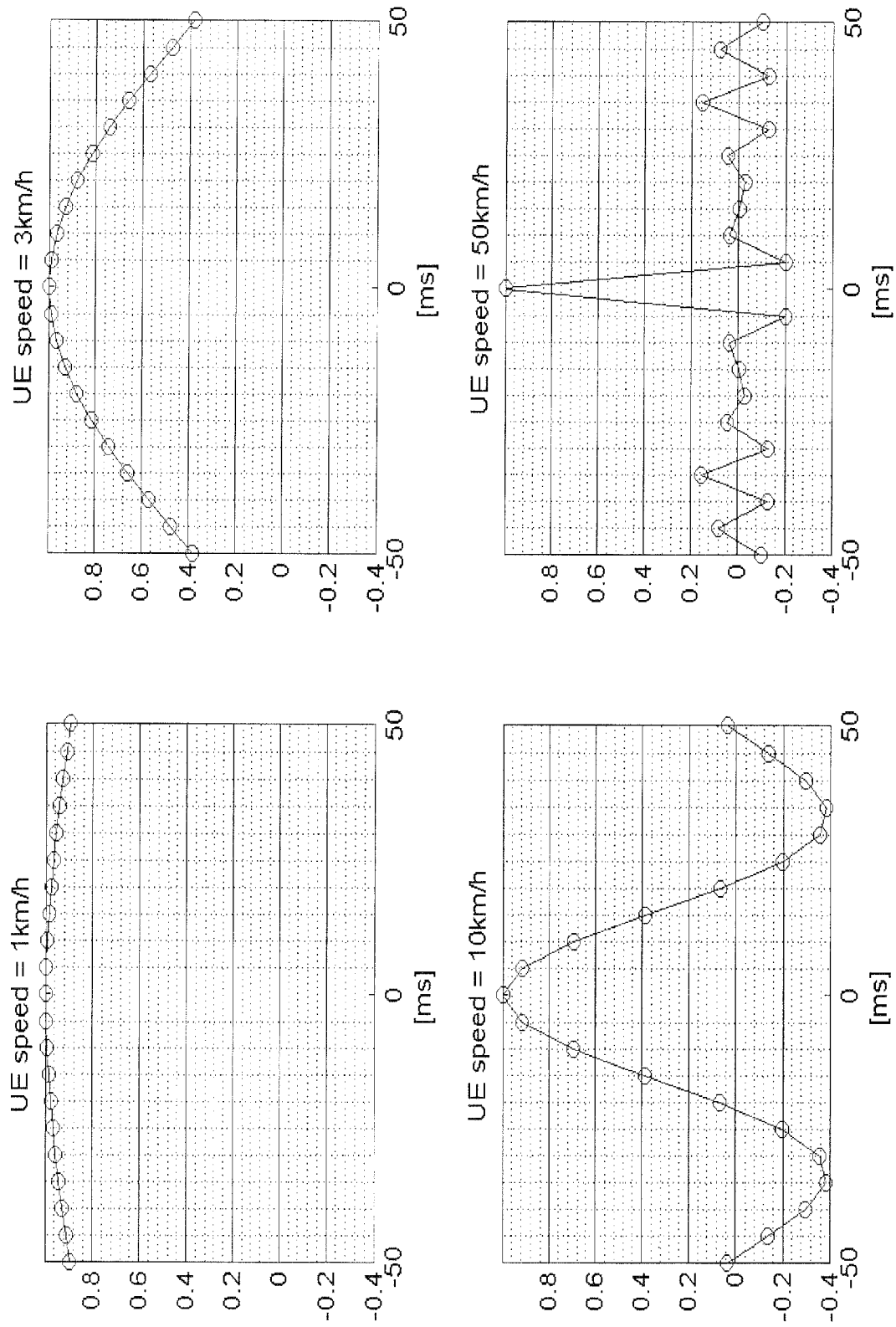
FIG. 3 shows exemplary autocorrelations of signal quality estimates for a moving UE.

The normalized ACF indicates how fast the channel conditions are changing and may be used as a measure of how fast a measurement becomes outdated. This is illustrated by exemplary values of the normalized ACF as shown in FIG. 3. In the example of FIG. 3, movement of a UE at different speeds (1 km/h, 3 km/h, 10 km/h, and 50 km/h) in a typical urban environment was simulated and the normalized ACF computed in steps of 5 ms. As can be seen, the measurements are highly correlated over a large time interval when the UE moves at the lowest speed of 1 km/h. However, the interval in which the measurements are correlated narrows with increasing speed of the UE. The value of the normalized ACF may thus be used as a measure of the uncertainty of a measurement, a high value of the normalized ACF corresponding to a low uncertainty. For the scenario in which the UE moves at a speed of 50 km/h a larger uncertainty would be assumed than in the other scenarios.

Further, the example of FIG. 3 also illustrates that a reporting of measurements at a longer periodicity may result in increased uncertainty of the reported measurements. For example, if it is assumed that in the scenario in which the UE moves at 50 km/h there is a time interval of 3 ms between a radio transmission to the UE and the last report of measurements by the UE, the corresponding ACF shows that at the time of the radio transmission the reported measurements would no longer accurately reflect the actual channel conditions.

The uncertainty may also be estimated based on a statistical measurement error. Also in this case, the estimation could be performed by the UE 10 and the estimated uncertainty reported to the base station 100, e.g., together with the measured signal quality, or the uncertainty could be determined by the base station 100 depending on the measured signal qualities reported by the UE 10. The statistical measurement error can for example be estimated based on a mean square error or a minimum mean square error of a set of measurements. Then the uncertainty may then be represented in terms of the statistical measurement error itself or as a function thereof. For example, the uncertainty could be calculated by applying the Gaussian Q function to the statistical measurement error.

In some scenarios, also movement of the UE 10 may be considered in the determination of the uncertainty. Here, in particular speed and/or direction of the movement may be considered. For example, if monitoring of position data of the UE 10 indicates that the UE 10 moves at high speed, e.g., at a speed exceeding a threshold value, a higher uncertainty may be assigned to the measured signal qualities. Further, as compared to a situation in which the UE 10 is moving along a propagation direction of a certain beam, a higher uncertainty may be assigned to the measured signal qualities for this beam when the UE 10 moves in other directions, e.g., depending on an angular deviation of the direction of the movement from the propagation direction of the beam.

If the uncertainty is determined by the UE 10, correspondingly configured measurement reports to be transmitted from the UE 10 to the base station 100 may be defined. Such measurement reports may for example provide a measured signal quality for each beam and, additionally, an uncertainty associated with such measured signal qualities. If the uncertainty is determined by the base station 100 on the basis of the measured signal qualities, also existing types of measurement reports may be utilized, e.g., measurement reports as defined in the LTE radio technology for reporting CSI RS (Channel State Information Reference Signal) or CSI IM (Channel State Information Interference Measurement).

The adaptation of the beamforming configuration may be performed with the aim of meeting a certain target BLER (Block Error Rate) or minimizing the BLER for a given throughput. This may be achieved by using the multiple beams for providing a transmit diversity, i.e., by transmitting the same data in each beam.

As mentioned above, with increasing uncertainty, a higher number of beams may be selected for the radio transmissions and/or the weighting of the beams in terms of transmit power distribution or code rate of each beam may be leveled. The adaptation of the number of beams and the adaptation of the weighting of the beams may be performed sequentially, e.g., by first defining the beams and weighting these beams, e.g., by using a water-filling based algorithm based on the estimated signal qualities. For example, this may involve increasing the transmit powers of the beams until the expected SINRs of the beams allow for achieving the target BLER. The transmit powers may be adapted by selecting between predefined power levels, such as zero, medium, and full power. However, also a higher or lower granularity of adapting the power levels may be utilized. The code rates may be adapted by selecting between different modulation and coding schemes, such as between different orders of QAM (Quadrature Amplitude Modulation).

Figure 4:
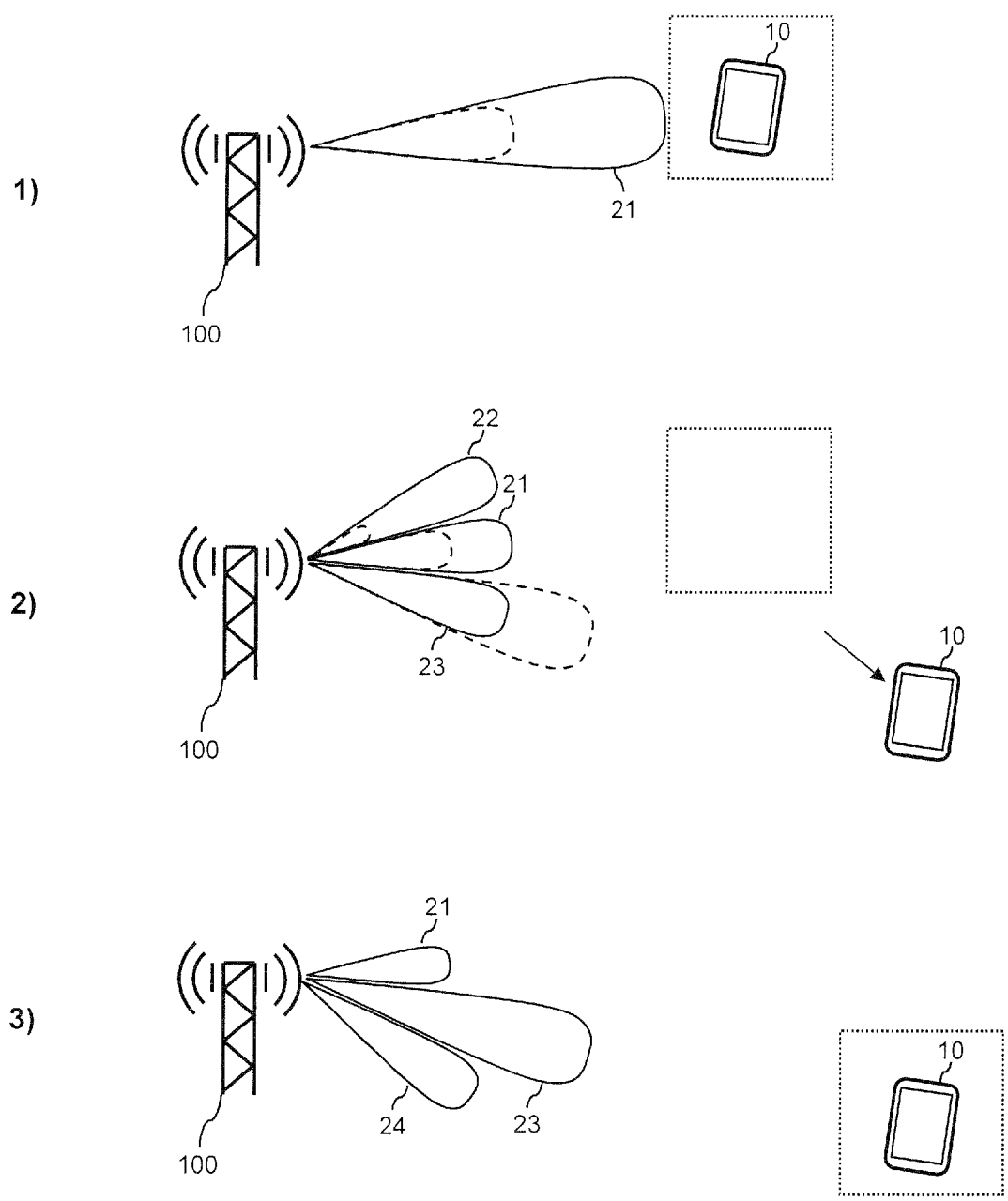
FIG. 4 shows an exemplary scenario in which a beamforming configuration is adapted for a moving UE.

FIG. 4 shows an exemplary scenario where the beamforming configuration for radio transmissions from the base station 100 to the UE 10 is adapted while the UE 10 moves with respect to the base station 100. In the example of FIG. 4, it is assumed that the beam forming configuration defines one or more beams 21, 22, 23, 24 each having 15° angular width, and that for each beam utilized for transmission of data and detected by the UE 10 the signal quality is reported. In FIG. 4, the reported signal quality is illustrated by the size of a dashed representation of the corresponding beam 21, 22, 23, 24. A dashed box illustrates a position of the UE 10 as currently assumed by the base station 100.

Initially, as illustrated by part 1) of FIG. 4, the UE 10 reports a good signal quality on a single beam 21. Then, as illustrated by part 2) of FIG. 4, the UE 10 moves to another position. Accordingly, the reported signal quality decreases and the base station 100 determines a higher uncertainty. In response to the higher uncertainty, the base station 100 lowers the transmit power of the beam 21 and extends the beamforming configuration by two further beams 22, 23, neighboring to the beam 21. As illustrated by the dashed representations of the beams 21, 22, 23, a low signal quality is reported for the beam 22, a medium signal quality is reported for the beam 21, and a high signal quality is reported for the beam 23. On the basis of these reported signal qualities, the base station 100 further adapts the beamforming configuration by removing the beam 22 from the beamforming configuration, adding a further beam 24 neighboring to the beam 23, reducing the transmit power of the beam 21, and increasing the transmit power of the beam 23, resulting in a beam configuration as illustrated in part 3) of FIG. 4. As can be seen, the base station 100 thus adapts the beamforming configuration in such a way that the beams utilized for the transmission of data are shifted towards the direction in which the UE 10 is located.

Figure 5:
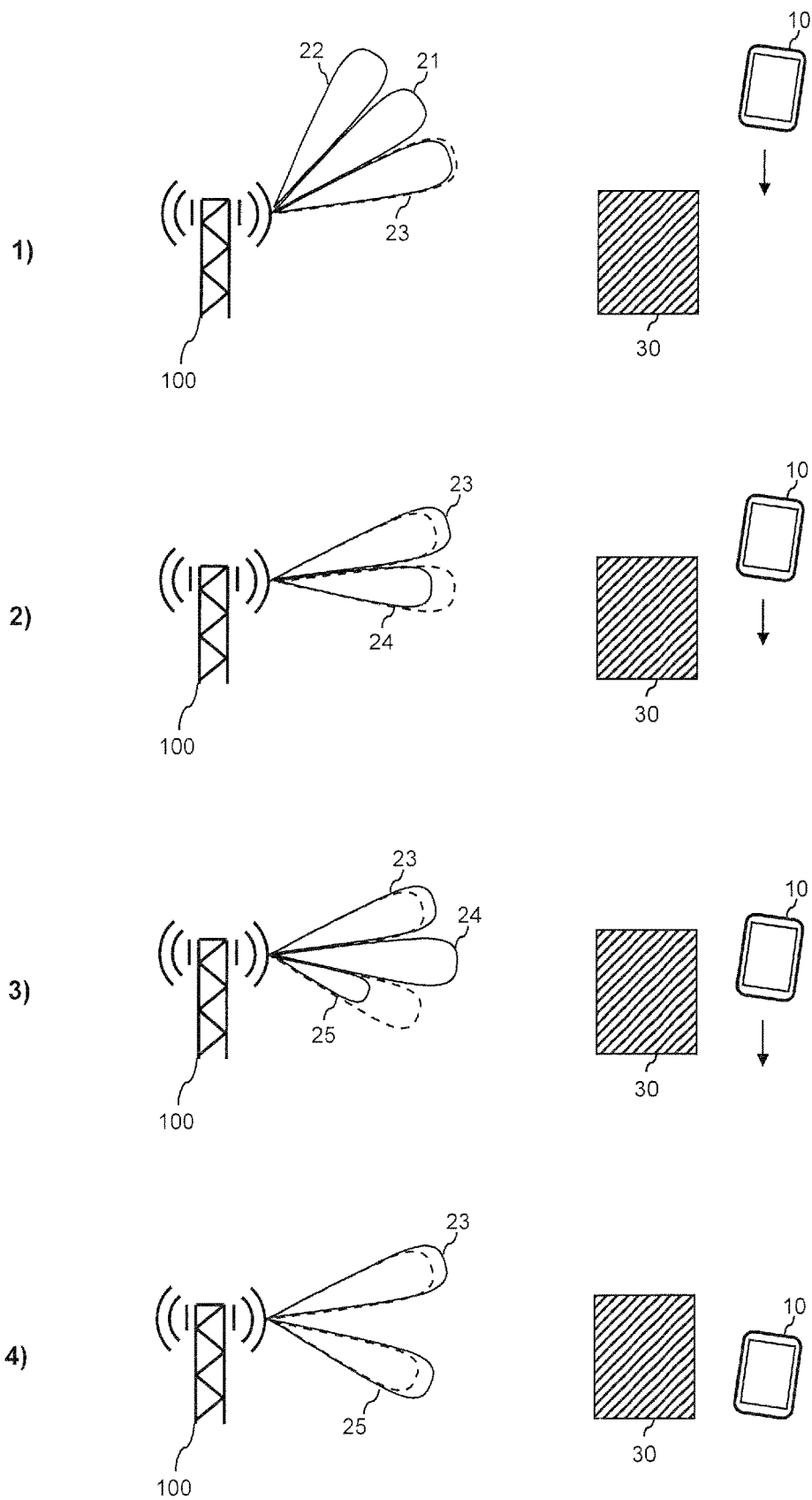
FIG. 5 shows an exemplary scenario in which a beamforming configuration is adapted taking into account shadowing effects.

FIG. 5 shows a further exemplary scenario where the beamforming configuration for radio transmissions from the base station 100 to the UE 10 is adapted while the UE 10 moves with respect to the base station 100 and a shadowing object 30, e.g., a building, is present. Also in the example of FIG. 5, it is assumed that the beam forming configuration defines one or more beams 21, 22, 23, 24, 25 each having 15° angular width, and that for each beam utilized for transmission of data and detected by the UE 10 the signal quality is reported. Similar to FIG. 4, the reported signal quality is illustrated by the size of a dashed representation of the corresponding beam 21, 22, 23, 24, 25.

Initially, as illustrated by part 1) of FIG. 5, the base station 100 selects a beamforming configuration of three beams 21, 22, 23 and weights these beams 21, 22, 23 with equal transmit powers. However, the UE 10 detects only the beam 23 and therefore reports the signal quality only for the beam 23. The reported signal quality is illustrated by the dashed representation of the beam 23. Since a high signal quality is reported for the beam 23, the base station 100 adapts the beamforming configuration by removing the beams 21, 22 from the beamforming configuration, by adding a further beam 24 neighboring to the beam 23, and by increasing the transmit power of the beam 23, resulting in a beamforming configuration as illustrated in part 2) of FIG. 5. As illustrated by part 2) of FIG. 5, in this situation substantially the same signal quality is reported for the beams 23 and 24. Further, the UE 10 starts to move behind the shadowing object 30, which increases the determined uncertainty. The base station 100 reacts to this situation by adding a further beam 25, neighboring to the beam 24, to the beamforming configuration and by decreasing the transmit power of the beam 23, resulting in a beamforming configuration as illustrated in part 3) of FIG. 5. As illustrated by part 3) of FIG. 5, the UE 10 now has moved completely behind the shadowing object 30, resulting in the beam 24 no longer being detected by the UE 10. As further illustrated, substantially equal medium signal qualities are reported for the beams 23 and 25. As a result, the base station 100 further adapts the beamforming configuration by removing the beam 24 from the beamforming configuration and by increasing the transmit powers of the beams 23 and 25, resulting in a beamforming configuration as illustrated in part 4) of FIG. 5. As can be seen from the example of FIG. 5, beams offering weak performance, e.g., having a signal quality below a threshold, may be removed from the beamforming configuration.

Figure 6:
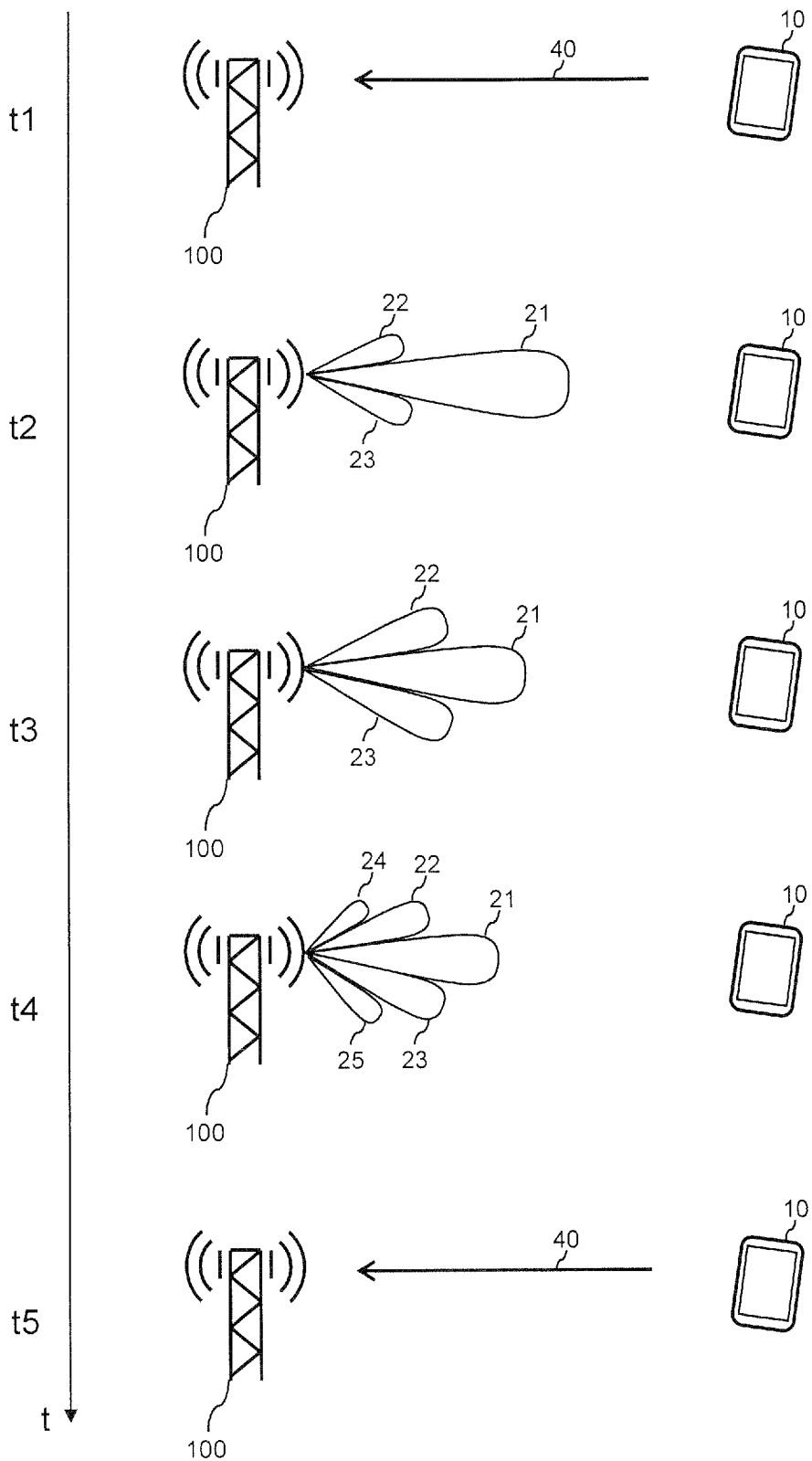
FIG. 6 shows an exemplary scenario in which a beamforming configuration is adapted taking into account age of measurements on which signal quality estimates are based.

FIG. 6 shows a further exemplary scenario where the beamforming configuration for radio transmissions from the base station 100 to the UE 10 is adapted depending on the age of the last report 40 of measured signal qualities from the UE 10. Also in the example of FIG. 6, it is assumed that the beam forming configuration defines one or more beams 21, 22, 23, 24, 25 each having 15° angular width, and that for each beam utilized for transmission of data and detected by the UE 10 the signal quality is reported. In the scenario of FIG. 6, a higher uncertainty is assigned to the reported signal qualities as the age of the last report increases. This may be done in addition or as an alternative to determining uncertainties depending on the measurements of the signal qualities themselves.

At t1, the base station receives a measurement report 40 from the UE 10. The signal qualities indicated in the measurement report and the associated uncertainty are utilized by the base station 100 at t2 for defining a beamforming configuration with three beams 21, 22, 23. At t2, the age of the measurement report 40 is still low and the uncertainty is thus considered to be low as well, which means that in the beamforming configuration determined at t2 one of the beams 21 is prioritized by being assigned a higher transmit power than the other beams 22, 23. At t3, the base station 100 adapts the beamforming configuration to reflect the increased age of the measurement report 40 received at t1. In particular, the base station 100 adapts the beamforming configuration by decreasing the transmit power of the beam 21 and increasing the transmit power of the beams 22 and 23, i.e., by leveling the weighting of the beams 21, 22, 23. At t4, the base station 100 further adapts the beamforming configuration to reflect the further increased age of the measurement report 40 received at t1. In this case, the base station 100 adapts the beamforming configuration by adding a further beam 24 neighboring to the beam 22 and a further beam 25 neighboring to the beam 23. Further, the base station 100 decreases the transmit powers of the beams 21, 22, 23. As a result, the transmit power is distributed over a larger angular region. At t5, the base station 100 receives a next measurement report 40. In the scenario of FIG. 6, the measurement report 40 received at t1 and optionally earlier measurement reports may be utilized by the base station 100 to assess how strongly the measurement report 40 received at t1 can be expected to deviate from the actual channel conditions.

Figure 7:
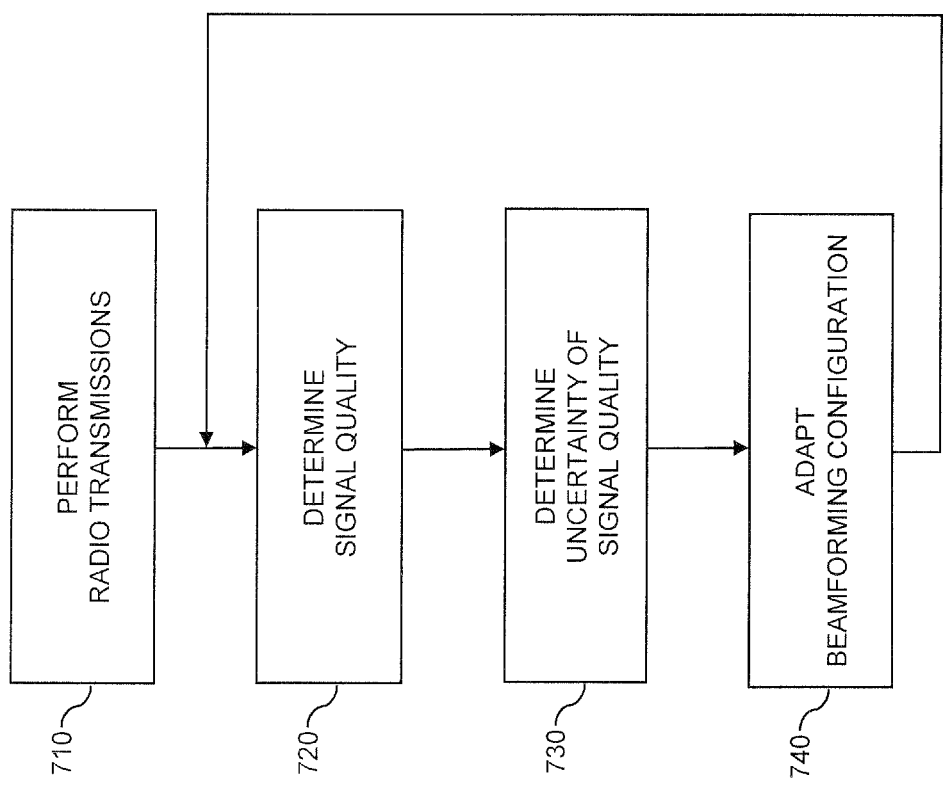
FIG. 7 shows a flowchart for schematically illustrating a method according to an embodiment of the invention.

FIG. 7 shows a flowchart for illustrating a method of controlling radio transmissions which may be utilized for implementing the illustrated concepts. The radio transmissions are performed from a first device to a second device, e.g., from a base station of a cellular network, such as the base station 100, to a communication device connected to the cellular network, such as the UE 10. The method may be performed by the device which performs the radio transmissions. Further, the method could also be performed by a control device which controls radio transmissions performed by some other device. If a processor-based implementation of the device is used, the steps of the method may be performed by one or more processors of the device.

At step 710, the radio transmissions from the first device to the second device are performed. For performing the radio transmissions, a beamforming configuration is applied by the first device. The beamforming configuration may define a set of one or more of beams, such as the above-mentioned beams 21, 22, 23, 24, 25. The beams may be generated by transmit diversity operation of multiple antennas. Each beam may correspond to a certain distribution, in terms of power and relative phase, of the transmitted signal over the multiple antennas so that the total transmitted signal energy is focused in one or more spatial directions, also referred to as beam direction.

At step 720, a signal quality associated with the radio transmissions is determined. The signal quality may be determined for each of the beams. The signal quality may be determined on the basis of reports provided by the second device.

At step 730, an uncertainty of the determined signal quality is determined. The uncertainty may be determined for each of the beams. The uncertainty may be determined on the basis of reports provided by the second device. Here, it should be noted that the reports may indicate only the signal quality and the uncertainty be determined from the reports. Further, the reports could also indicate the uncertainty as determined by the second device.

The uncertainty may be determined on the basis of an autocorrelation of multiple measurements of the signal quality and/or on the basis of other statistical analysis of measurements of the signal quality. Further, the uncertainty may be determined depending on movement of the second device with respect to the first device, e.g., depending on speed and/or direction of the movement. For example, as mentioned above, in response to a movement at high speed, a higher uncertainty may be assumed. Similarly, in response to an increased angular deviation of the direction of movement from the beam direction, an increased uncertainty may be assumed.

In some scenarios, the uncertainty may also be determined depending on a time interval which has elapsed from a last measurement of the signal quality. An example of a corresponding consideration of the age of measurements or measurement reports is explained above in connection with FIG. 6.

At step 740, the beamforming configuration applied by the first device for performing the radio transmissions to the second device is adapted depending on the determined signal quality and uncertainty.

The beamforming configuration may be adapted by setting, depending on the determined uncertainty, a transmit power assigned to each of the beams. This may for example include assigning a higher transmit power weight to beams with lower uncertainty or selecting a uniform transmit power weight distribution if the uncertainty is high for all beams.

Further, the beamforming configuration may be adapted by setting, depending on the determined uncertainty, a coding scheme assigned to each of the beams. This may for example include selecting more robust coding schemes for larger uncertainties.

Further, the beamforming configuration may be adapted by setting, depending on the determined uncertainty, a number of the beams. This may for example include using a higher number of beams in case of large uncertainty or eliminating beams in response to the uncertainty being low. For example, in response to an increase of the determined uncertainty, the number of the beams may be increased and/or in response to a decrease of the determined uncertainty, the number of the beams may be decreased.

Further, the beamforming configuration may be adapted by setting, depending on the determined signal quality, a direction of the beams. Examples of such adaptation in response to movement of the second device relative to the first device are explained above in connection with FIGS. 4 and 5.

In view of the above-described functionalities, a device for implementing the illustrated concepts may be provided with a module configured to determine a signal quality associated with radio transmissions from a first device to a second device, such as explained in connection with step 720, a module configured to determine an uncertainty of the determined signal quality, such as explained in connection with step 730, and a module configured to adapt a beamforming configuration applied by the first device for performing the radio transmissions to the second device. If the device corresponds to the first device, the device may also be provided with a module configured to perform the radio transmissions to the second device.

Figure 8:
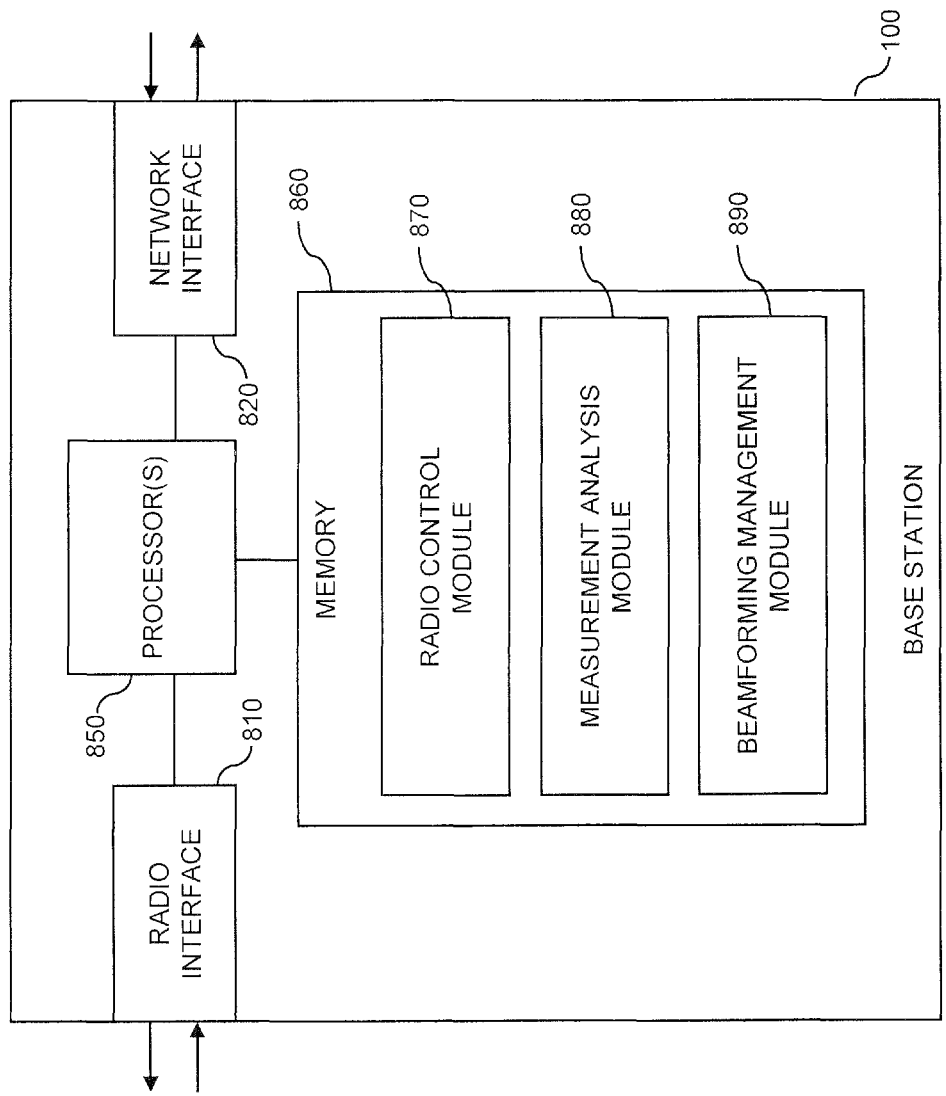
FIG. 8 schematically illustrates a base station according to an embodiment of the invention.

FIG. 8 illustrates exemplary structures which may be used for implementing the above concepts in the base station 100.

As illustrated, the base station 100 may include a radio interface 810 for performing the radio transmissions to the communication device. The radio interface 810 is assumed to support beamforming by multi-antenna transmissions. Further, the radio interface 810 could also be utilized by the base station 100 for receiving reports of measured signal qualities and/or associated uncertainties. Further, the device may include a network interface 820, e.g., for communication with other network nodes. For example, the network interface 820 may be utilized for establishing a backhaul connection of the base station 100.

Further, the base station 100 may include one or more processors 850 coupled to the interfaces 810, 820, and a memory 860 coupled to the processor(s) 850. The memory 860 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 860 includes suitably configured program code to be executed by the processor(s) 850 so as to implement the above-described functionalities of the base station 100. In particular, the memory 860 may include various program code modules for causing the base station 100 to perform processes as described above, e.g., corresponding to the method steps of FIG. 7.

As illustrated, the memory 860 may include a radio control module 870 for implementing the above-described functionalities of performing radio transmissions on the basis of a certain beamforming configuration via the radio interface 810, e.g., as explained in connection with step 710 of FIG. 7. Further, the memory 860 may include a measurement analysis module 880 for implementing the above-described functionalities of determining the signal qualities and associated uncertainties, e.g., as explained in connection with steps 720 and 730 of FIG. 7. Further, the memory 860 may include a beamforming management module 890 for implementing the above-described functionalities of adapting the beamforming configuration, e.g., as explained in connection with step 740 of FIG. 7.

It is to be understood that the structures as illustrated in FIG. 8 are merely schematic and that the base station 100 may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of a base station of a cellular network. According to some embodiments, also a computer program may be provided for implementing functionalities of the device, e.g., in the form of a physical medium storing the program code and/or other data to be stored in the memory 860 or by making the program code available for download or by streaming.

Figure 9:
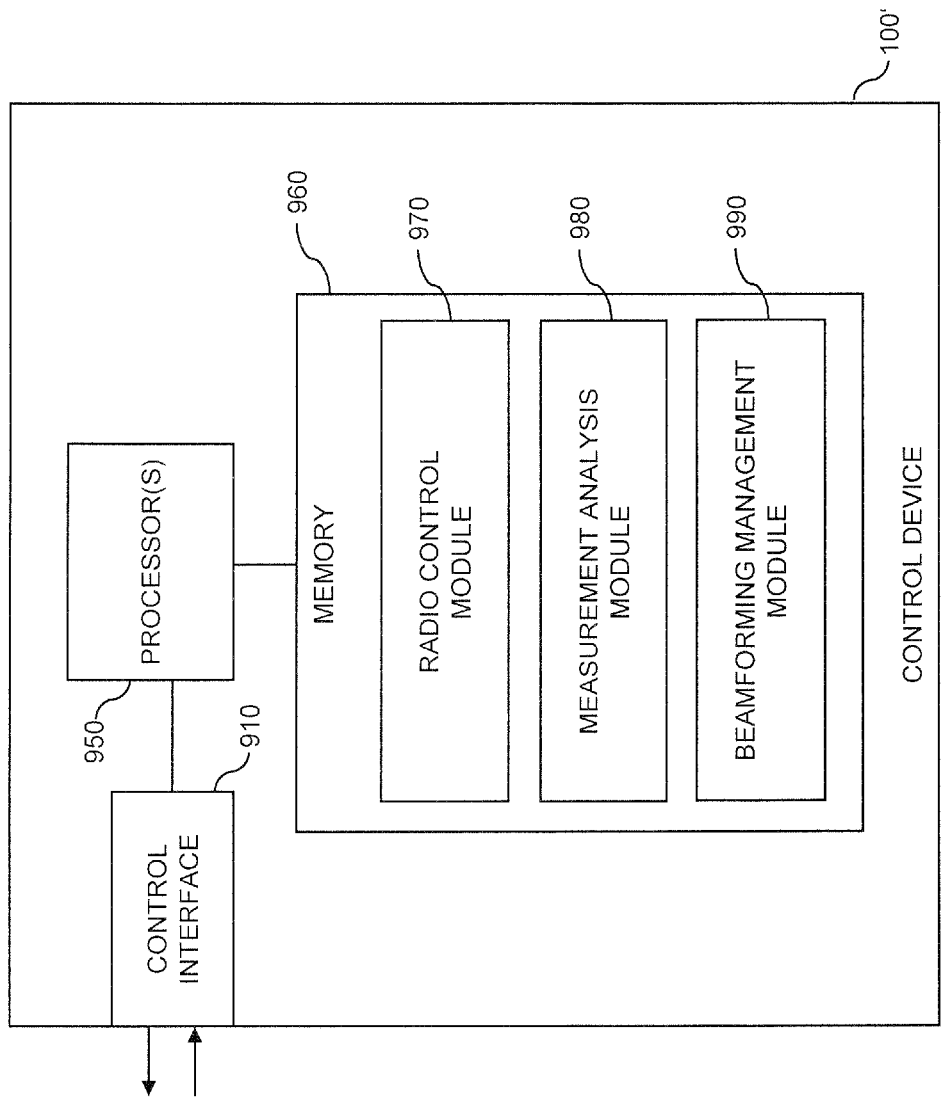
FIG. 9 schematically illustrates a control device according to an embodiment of the invention.

FIG. 9 illustrates exemplary structures which may be used for implementing the above concepts in a control device 100' which controls radio transmissions from a first device to a second device. The control device 100' may be different from the first device and the second device, e.g., correspond to a dedicated control device. For example, the control device 100' could be a base station controller or radio network controller of a cellular network. Further, the control device 100' could also correspond to the second device, i.e., to the recipient of the radio transmissions.

As illustrated, the control device 100' may include a control interface 910 for controlling the radio transmissions. The control interface 910 may be based on various kinds of control protocols and may utilize wire based or wireless transmission of control commands for setting a beamforming configuration applied when performing the radio transmissions. Further, the control interface 910 could also be utilized by the control device 100' for receiving reports of measured signal qualities and/or associated uncertainties.

Further, the control device 100' may include one or more processors 950 coupled to the control interface 910, and a memory 960 coupled to the processor(s) 950. The memory 960 may include a ROM, e.g., a flash ROM, a RAM, e.g., a DRAM or SRAM, a mass storage, e.g., a hard disk or solid state disk, or the like. The memory 960 includes suitably configured program code to be executed by the processor(s) 950 so as to implement the above-described functionalities of controlling radio transmissions. In particular, the memory 960 may include various program code modules for causing the control device 100' to perform processes as described above, e.g., corresponding to method steps 720, 730, and 740 of FIG. 7.

As illustrated, the memory 960 may include a radio control module 970 for controlling radio transmissions on the basis of a certain beamforming configuration, e.g., as explained in connection with step 710 of FIG. 7. Further, the memory 960 may include a measurement analysis module 980 for implementing the above-described functionalities of determining the signal qualities and associated uncertainties, e.g., as explained in connection with steps 720 and 730 of FIG. 7. Further, the memory 960 may include a beamforming management module 990 for implementing the above-described functionalities of adapting the beamforming configuration, e.g., as explained in connection with step 740 of FIG. 7.

It is to be understood that the structures as illustrated in FIG. 9 are merely schematic and that the control device 100' may actually include further components which, for the sake of clarity, have not been illustrated, e.g., further interfaces or processors. Also, it is to be understood that the memory 960 may include further types of program code modules, which have not been illustrated. According to some embodiments, also a computer program may be provided for implementing functionalities of the control device 100', e.g., in the form of a physical medium storing the program code and/or other data to be stored in the memory 960 or by making the program code available for download or by streaming.

Figure 10:
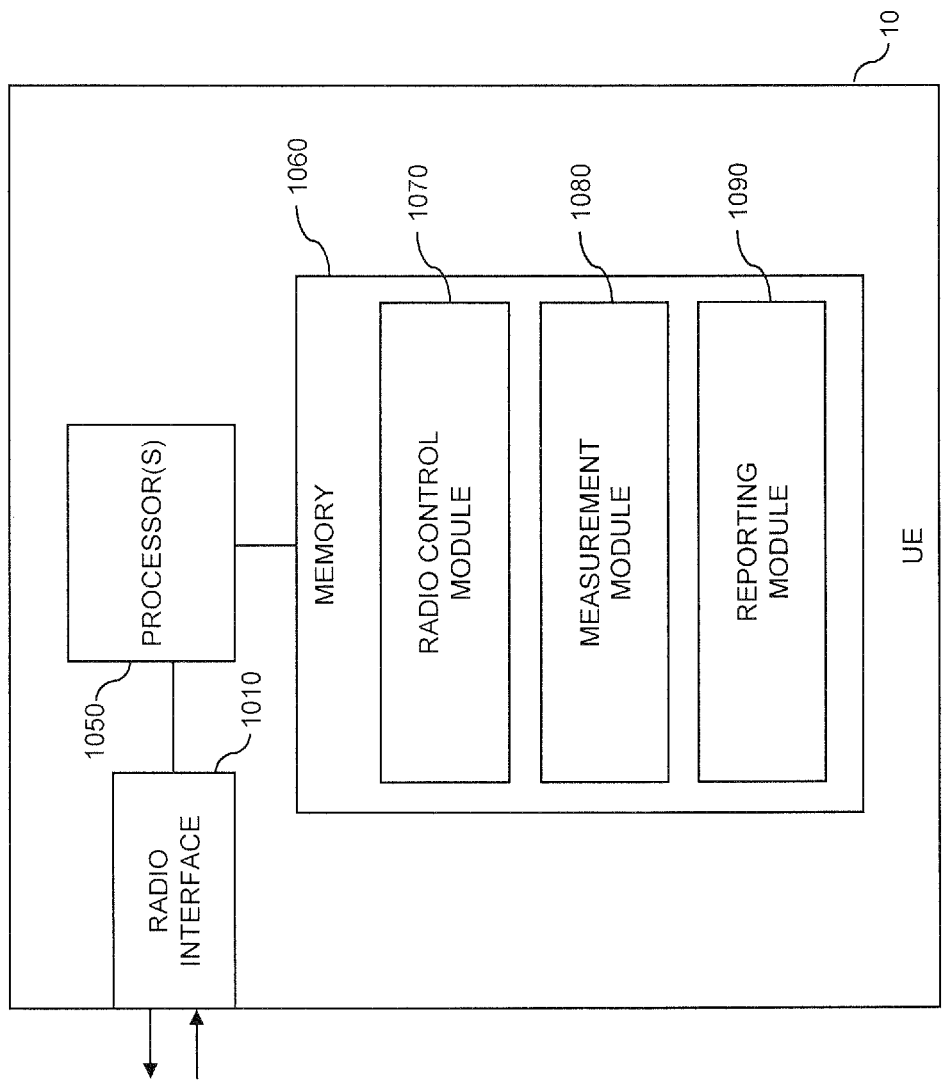
FIG. 10 schematically illustrates a communication device with reporting functionalities according to an embodiment of the invention.

FIG. 10 illustrates exemplary structures which may be used for providing the UE 10 with reporting functionalities for implementing the above concepts.

As illustrated, the UE 10 may include a radio interface 1010 for receiving the radio transmissions. For receiving, the radio transmissions, the radio interface 1010 may support a multi-antenna receiver technology. Further, the radio interface 1010 may be utilized for sending reports of measured signal qualities and/or associated uncertainties.

Further, the UE 10 may include one or more processors 1050 coupled to the radio interface 1010, and a memory 1060 coupled to the processor(s) 1050. The memory 1060 may include a ROM, e.g., a flash ROM, a RAM, e.g., a DRAM or SRAM, a mass storage, e.g., a hard disk or solid state disk, or the like. The memory 1060 includes suitably configured program code to be executed by the processor(s) 1050 so as to implement the above-described reporting functionalities of the UE 10.

As illustrated, the memory 1060 may include a radio control module 1070 for controlling receipt of radio transmissions via the radio interface 1010. Further, the memory 1060 may include a measurement module 1080 for implementing the above-described functionalities of performing measurements of signal qualities and determining associated uncertainties. determining the signal qualities and associated uncertainties, e.g., as explained in connection with steps 720 and 730 of FIG. 7. Further, the memory 1060 may include a reporting module 1090 for implementing the above-described functionalities of sending reports of the measured signal qualities and associated uncertainties.

It is to be understood that the structures as illustrated in FIG. 10 are merely schematic and that the UE 10 may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a UE. According to some embodiments, also a computer program may be provided for implementing functionalities of the UE 10, e.g., in the form of a physical medium storing the program code and/or other data to be stored in the memory 1060 or by making the program code available for download or by streaming.

As can be seen, the concepts as described above may be used for efficiently utilizing beamforming in radio transmissions. In particular, the applied beamforming configuration may be adapted by weighting beams of the applied beamforming configuration in a "soft" manner and thus reducing the risk of making an incorrect beam selection. By dynamically adapting the beamforming configuration, rapid adaptation to the actual channel conditions may be achieved. Here, the possibility of simultaneously assessing multiple different beams may offer significant advantages.

It is to be understood that the examples and embodiments as explained above are merely illustrative and susceptible to various modifications. For example, the illustrated concepts may be applied in connection with various radio technologies, without limitation to the above-mentioned example of an LTE or 5G radio technology, also including infrastructureless ad-hoc network technologies or device-to-device radio technologies. Moreover, it is to be understood that the above concepts may be implemented by using correspondingly designed software to be executed by one or more processors of an existing device, or by using dedicated device hardware.

The invention claimed is:

1. A method of controlling radio transmissions, the method comprising:
   determining a signal quality associated with radio transmissions from a first device to a second device;
   determining an uncertainty of the determined signal quality; and
   depending on the determined signal quality and uncertainty, adapting a beamforming configuration applied by the first device for performing the radio transmissions to the second device,
   wherein the beamforming configuration defines a set of one or more of beams generated by transmit diversity operation of multiple antennas, and
   wherein the beamforming configuration is adapted by setting, depending on the determined uncertainty, a number of the beams comprising at least one of:
   in response to an increase of the determined uncertainty, increasing the number of the beams; and
   in response to a decrease of the determined uncertainty, decreasing the number of the beams.

2. The method of claim 1, further comprising determining the signal quality and the uncertainty for each of the beams.

3. The method of claim 1, wherein the beamforming configuration is adapted by at least one of:
   setting, depending on the determined uncertainty, a transmit power assigned to each of the beams; and
   setting, depending on the determined uncertainty, a coding scheme assigned to each of the beams.

4. The method of claim 1, wherein the beamforming configuration is adapted by setting, depending on the determined signal quality, a direction of the beams.

5. The method of claim 1, wherein the signal quality and the uncertainty are determined based on reports provided by the second device.

6. The method of claim 1, wherein the uncertainty is determined based on an autocorrelation of multiple measurements of the signal quality.

7. The method of claim 1, wherein the uncertainty is determined based on movement of the second device with respect to the first device.

8. The method of claim 1, wherein the uncertainty is determined based on a time interval which has elapsed from a last measurement of the signal quality.

9. The method of claim 1, wherein the first device is a base station of a cellular network and the second device is a communication device connected to the cellular network.

10. A device, comprising:
    processing circuitry;
    memory containing instructions executable by the processing circuitry whereby the device is operative to:
    determine a signal quality associated with radio transmissions from a first device to a second device;
    determine an uncertainty of the determined signal quality; and
    depending on the determined signal quality and uncertainty, adapt a beamforming configuration applied by the first device for performing the radio transmissions to the second device,
    wherein the beamforming configuration defines a set of one or more of beams generated by transmit diversity operation of multiple antennas, and
    wherein the device is configured to adapt the beamforming configuration by setting, depending on the determined uncertainty, a number of the beams such that the device is operative to;
    in response to an increase of the determined uncertainty, increase the number of the beams; and/or
    in response to a decrease of the determined uncertainty, decrease the number of the beams.

11. The device of claim 10, wherein the instructions are such that the device is operative to determine the signal quality and the uncertainty for each of the beams.

12. The device of claim 10, wherein the instructions are such that the device is operative to adapt the beamforming configuration by at least one of:
    setting, depending on the determined uncertainty, a transmit power assigned to each of the beams; and
    setting, depending on the determined uncertainty, a coding scheme assigned to each of the beams.

13. The device of claim 10, wherein the instructions are such that the device is operative to adapt the beamforming configuration by setting, depending on the determined signal quality, a direction of the beams.

14. The device of claim 10, wherein the instructions are such that the device is operative to determine the signal quality and the uncertainty based on reports provided by the second device.

15. The device of claim 10, wherein the instructions are such that the device is operative to determine the uncertainty based on an autocorrelation of multiple measurements of the signal quality.

16. The device of claim 10, wherein the instructions are such that the device is operative to determine the uncertainty based on movement of the second device with respect to the first device.

17. The device of claim 10, wherein the instructions are such that the device is operative to determine the uncertainty based on a time interval which has elapsed from a last measurement of the signal quality.

18. The device of claim 10, wherein the first device is a base station of a cellular network and the second device is a communication device connected to the cellular network.

19. The device of claim 10, wherein the device corresponds to the first device and comprises a radio interface for performing the radio transmissions to the second device.

20. The device of claim 10, wherein the device comprises a control interface for controlling the radio transmissions from the first device to the second device.

21. A non-transitory computer readable recording medium storing a computer program product for controlling radio transmissions from a first device to a second device, the computer program product comprising software instructions which, when run on processing circuitry of a device, causes the device to:
    determine a signal quality associated with the radio transmissions from the first device to the second device;
    determine an uncertainty of the determined signal quality; and
    depending on the determined signal quality and uncertainty, adapt a beamforming configuration applied by the first device for performing the radio transmissions to the second device,
    wherein the beamforming configuration defines a set of one or more of beams generated by transmit diversity operation of multiple antennas, and
    wherein the beamforming configuration is adapted by setting, depending on the determined uncertainty, a number of the beams comprising at least one of:

in response to an increase of the determined uncertainty, increasing the number of the beams; and in response to a decrease of the determined uncertainty, decreasing the number of the beams.

\* \* \* \* \*